United States Patent [19]
Lorenzen, Jr.

[11] 3,814,473
[45] June 4, 1974

[54] PROTECTIVE INNER LINER FOR TRUCK BODIES

[76] Inventor: George Fred Lorenzen, Jr., Rt. 1, Box 71-F, Bartow, Fla. 33830

[22] Filed: Mar. 15, 1972

[21] Appl. No.: 234,880

[52] U.S. Cl....... 296/39 R, 220/63 R, 224/42.42 R, D14/6 A
[51] Int. Cl............................................. B62d 33/00
[58] Field of Search............. 296/39 R, 39 A, 28 D; 220/63 R; 224/29 R, 42.42 R; 105/423

[56] References Cited
UNITED STATES PATENTS

| 601,976 | 4/1898 | Murray | 296/39 R |
|---|---|---|---|
| 2,898,146 | 8/1959 | Yudenfreund | 296/39 R |
| 3,027,044 | 3/1962 | Winstead | 220/63 R |
| 3,132,781 | 5/1964 | Poczatek | 224/42.42 R X |
| 3,480,321 | 11/1969 | Brandt et al. | 296/39 R X |
| 3,495,756 | 2/1970 | Achermann et al. | 220/63 R X |
| 3,653,710 | 4/1972 | Barnard | 296/39 R |

FOREIGN PATENTS OR APPLICATIONS

| 862,378 | 3/1961 | Great Britain | 296/39 R |

Primary Examiner—Kenneth H. Betts
Assistant Examiner—Leslie J. Paperner
Attorney, Agent, or Firm—B. P. Fishburne, Jr.

[57] ABSTRACT

The cargo box or body of a pick-up truck or the like has its interior surfaces completely covered and protected by a liner formed of plastics material or the like. The liner is formed to precisely fit the interior contours of the cargo box and to utilize the full cargo space to the maximum possible extent. The liner protects the finish on the cargo box against scratching and corrosion. A separate liner element is provided for the interior of the truck tailgate.

1 Claim, 6 Drawing Figures

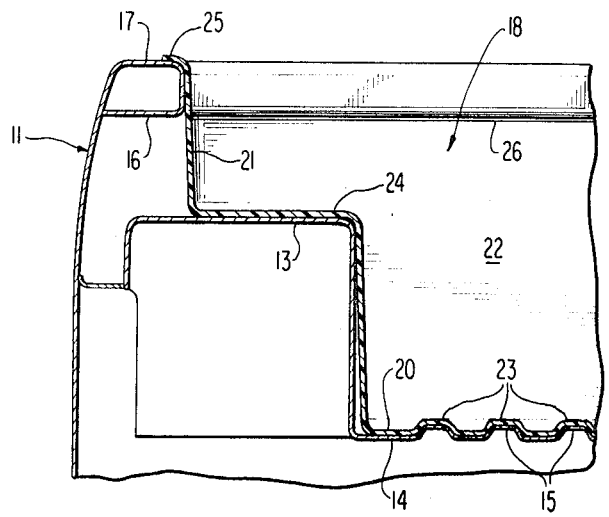
FIG.4
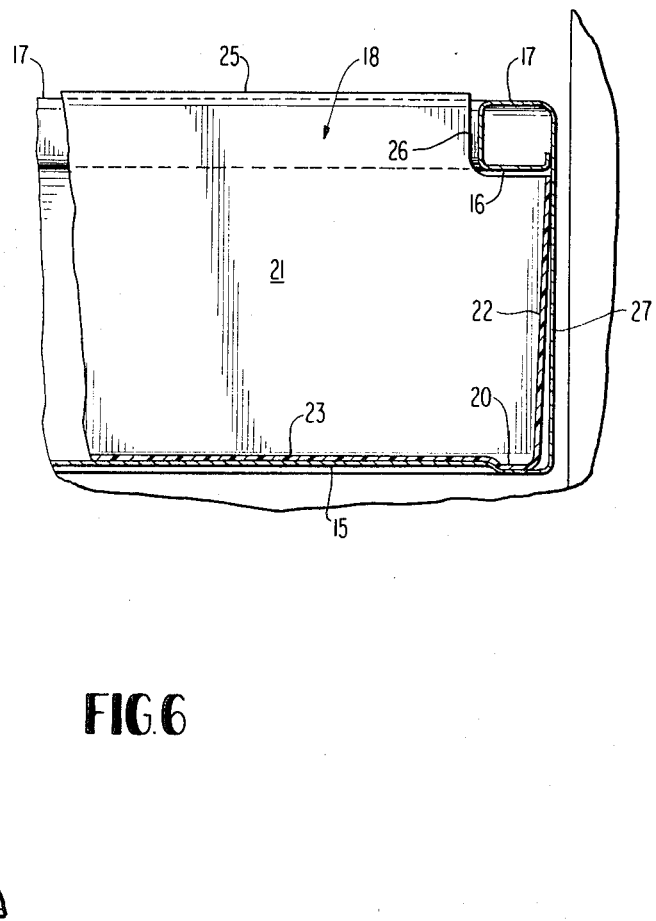
FIG.5
FIG.6

PROTECTIVE INNER LINER FOR TRUCK BODIES

The invention arises as a result of a need to protect the interior surfaces of pick-up truck cargo bodies or boxes from damage due to scratching or striking by hard objects as well as by the corrosive effects of certain materials, such as some fertilizers.

Modern day pick-up trucks are increasingly used particularly in rural and suburban areas for family transportation as well as for working vehicles. The interior and exterior finishings of pik-up trucks are becoming ever more attractive and refined to such an extent that the owners of such vehicles are increasingly reluctant to immediately damage the surfaces of the cargo space by exposing the same directly to rough or corrosive materials. While the cargo compartment surfaces are well finished by the manufacturer with paint, these surfaces cannot resist scratching and impact and the effect of certain corrosives, and they quickly deteriorate in normal use to a rather unsightly scratched and sometimes rusty condition.

The owners of these vehicles are reluctant to repeatedly repaint the interior surfaces of the cargo box, as this is laborious, time-consuming and seldom results in a satisfactory appearance. Usually, nothing is done to cope with the problem and the cargo space quickly takes on a very shabby appearance.

With the above in mind, the object of the invention is to provide a tough protective inner liner for the cargo box of a conventional pick-up truck which will resist damage caused by scratching, abrasion, striking with hard objects and corrosion. The inner liner will protect the original finish on the vehicle and will not detract from its appearance, in fact, the liner being available in various colors or in transparent form may be capable of improving the appearance of the vehicle.

An important feature of the invention resides in forming the inner liner from plastics material or the like, preferably utilizing vacuum over a precision male plug which conforms exactly to the interior shape of the cargo compartment. As a result of this, the inner liner will fit snugly into the cargo compartment and will be essentially rattle-free and will be supported at all critical points by the walls of the vehicle compartment. The liner is formed in such a manner that maximum utilization of the cargo space is taken advantage of and substantially no useful space is lost. A separate liner section is provided for the interior of the truck tailgate and when this tailgate is closed all interior surfaces are completely covered and protected by the preformed substantially rigid liner. The liner may be secured in place by a few screws or pop rivets, as found desirable. While a variety of materials could be used for the liner, a preferred material is polyethylene with a wall thickness of ½th to ¼ inch. This material lends itself well to vacuum forming and this is the preferred manner of producing the protective inner liner.

Other features and advantages of the invention will become apparent during the course of the following detailed description.

BRIEF DESCRIPTION OF DRAWING FIGURES

FIG. 4 is an enlarged fragmentary vertical section taken on line 4—4 of FIG. 1.

FIG. 5 is a similar section taken on line 5—5 of FIG. 1.

FIG. 6 is a fragmentary vertical section taken through a nested group of liner bodies as they would be positioned for shipment or storage.

DETAILED DESCRIPTION

Figure 1:
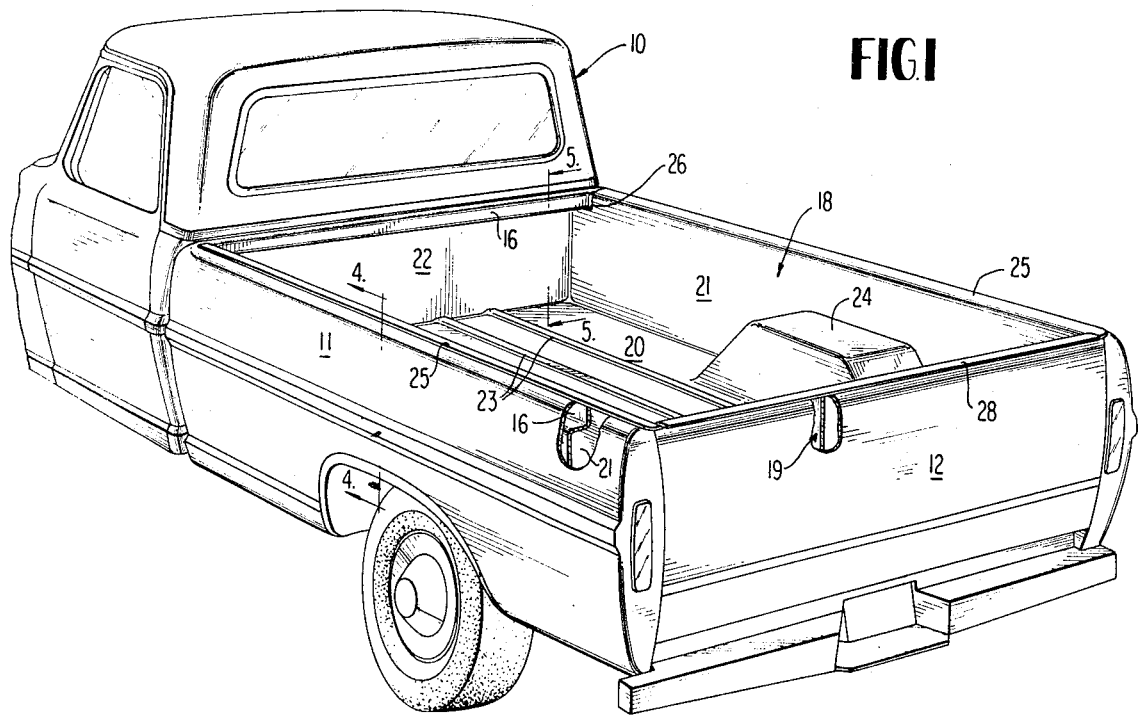
FIG. 1 is a perspective view of the invention showing the same applied to a conventional pick-up truck.
Figure 2:
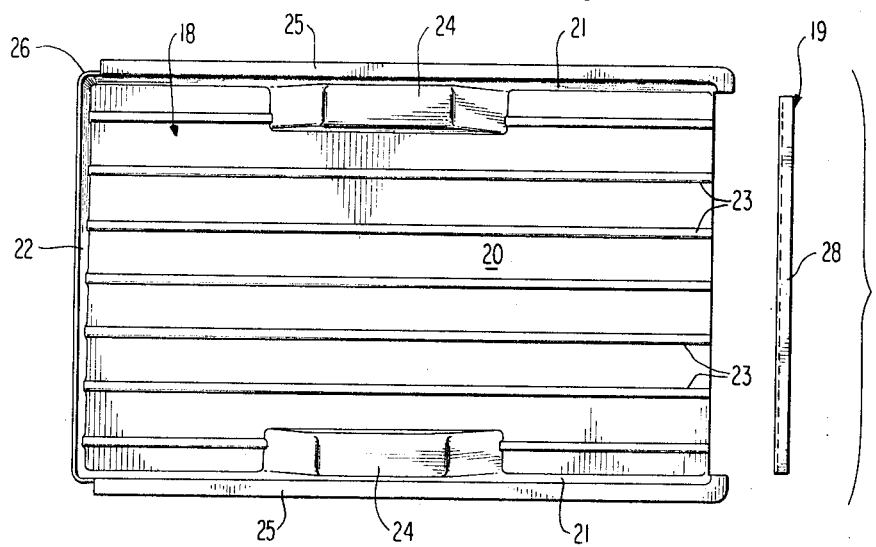
FIG 2 is a plan view of the protective liner embodying the invention removed from the truck with the two parts thereof in separated relationship.
Figure 3:
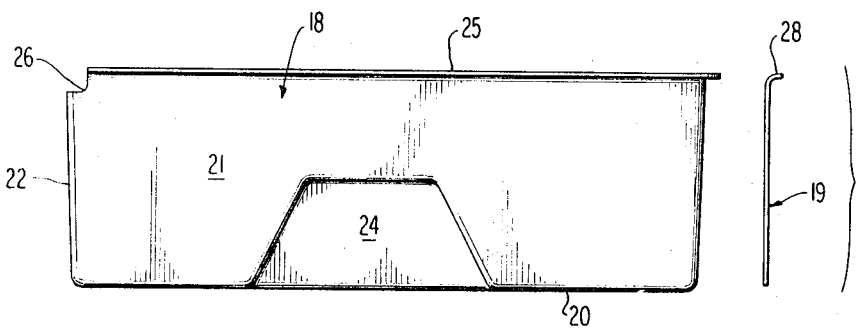
FIG. 3 is a side elevation of the liner parts shown in FIG. 2.

Referring to the drawings in detail, wherein like numerals designate like parts, the numeral 10 designates a conventional pick-up truck having a generally rectangular cargo box or body 11 open at its top and provided with a rear vertically swinging tailgate 12 adapted to assume upright and horizontal positions. The cargo box 11 is provided on opposite sides and between its ends with the customary wheel wells 13 to accommodate the rear wheels of the truck. As shown, these wheel wells project considerable distances inwardly of the cargo box side walls and well above the cargo box floor 14 which may be longitudinally ribbed or corrugated as indicated at 15. At the top of the cargo box 11, an integral box-like girder 16 extends around the three sides of the box and forms a ledge 17 projecting inwardly of the side and front walls of the box, the box rear side being open and adapted to be covered by the tailgate 12. The top of the tailgate, when closed, is at the same elevation as the continuous ledge around the three sides of the cargo box. The above is the general construction of the cargo box on one leading make of truck. Details of construction will vary slightly for the cargo box on different makes of trucks but the general construction is the same. In this connection, the liner forming the subject matter of the invention will be custom formed over a mold which precisely duplicates the interior configuration of the cargo box for the several leading makes of trucks. In this way, a perfect fit for the liner in the truck cargo box will be achieved.

The liner proper comprising the invention consists of a main body portion 18 and a tailgate liner secton 19, as indicated. Both of these elements are preferably formed by a vacuum forming process from a durable plastics material, such as polyethylene. Preferably, the liner components have a wall thickness in the range of ½–¼ inch. The particular plastics material employed is impact and scratch resistant, tear resistant and generally tough and durable. It is also corrosion resistant. The liner body portion 18 is seamless and therefore will not leak fluid onto the finish of the underlying sheet metal cargo box. The components 18 and 19 may be clear or transparent, tinted or deeply colored in a variety of colors to render them opaque and to match the color of the truck body. In these respects, the invention is extremely versatile.

The liner body portion 18 which conforms closely to the shape of the truck cargo compartment is a substantially rectangular open top box-like structure which includes a horizontal floor 20, longitudinal side walls 21 and a forward transverse wall 22, all integrally joined to form a relatively rigid structure. As previously explained, the floor 20 may be longitudinally ribbed at 23 to receive the longitudinal corrugations 15 of the truck cargo box. Similarly, the body portion 18 is provided in its opposite sides and bottom with wells 24 which fit over and receive the truck wheel wells 13. The body portion 18 is provided at its top and along its two longitudinal sides with horizontal outwardly projecting flanges 25 adapted to rest on the marginal ledge 17 of the cargo box when the truck is fitted with the invention. These flanges 25 fully protect the horizontal ledge 17 which is normally subjected to much abuse from lumber, pipes and the like which are frequently laid across the truck body.

To facilitate using to the maximum possible extent the full length of the truck cargo compartment, the body portion 18 is notched entirely across its forward upper corner as indicated at 26 in the drawings. Referring to FIG. 5, when the liner body portion 18 is placed in the truck cargo box, the notch 26 receives the front transverse portion of the box girder 16 so that the front wall 22 of the liner may be placed against the adjacent front wall 27 of the truck cargo box. This feature constitutes an important part of the invention in that it renders possible the full utilization of the truck cargo space in the important lengthwise direction.

As best shown in FIG. 6 and also apparent in FIGS. 4 and 5, the side walls and front wall of the liner body portion 18 are provided with a slight degree of draft or taper, mainly for the purpose of allowing several of the liner bodies to be nested for storage or shipment, as shown in FIG. 6. Because of the superior fit of the liner body portion 18 in the truck body or box, it is only necessary to employ a minimum number of screws or pop rivets for attaching the body portion to the truck. The close fit also renders the liner virtually rattle-free.

The separate tailgate liner section 19 is essentially a flat rectangular sheet of the identical material utilized for the body portion 10 and of a size and shape to completely cover the interior of the tailgate 12 when secured thereto with a few suitable fasteners, such as screws or rivets. To protect the upper edge of the tailgate, the liner section 19 is provided with a top integral flange 28 of the same width as the flange 25 and adapted to rest on the upper edge of the tailgate, as shown in FIG. 1. When the tailgate is closed, the flange 28 will form a continuation of the flanges 25 at the rear of the cargo box so that all upper edges are protected as well as all interior surfaces.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A protective liner for the cargo compartment of a pick-up truck or the like comprising a unitary liner body portion formed of tough impact, scratch, tear and corrosion-resistant plastic, sad liner body portion being open at its top and rear ends and possessing integrally joined bottom, side and forward walls, said liner body portion having substantially the identical shape of the interior configuration of said cargo compartment and substantially covering all interior surfaces of said compartment including the bottom, side and forward walls thereof, a pair of top outwardly projecting longitudinal flanges on said side walls adapted to rest on and to cover and protect the corresponding top edges of said cargo compartment, the forward end of the liner body portion being recessed across its entire width to produce a forward wall on the body portion of reduced height in comparison to the side walls of the body portion and said side walls being notched at their forward upper corners, whereby said reduced height forward wall may be engaged below a fixed cross member of said cargo compartment at the front thereof and said forward wall may be placed against the corresponding wall of the cargo compartment to utilize the full space of such compartment, and a separately formed liner section of said plastic material mountable upon the interior of a tailgate forming the rear wall of said cargo compartment when closed and covering the interior surface of the tailgate and having a top outwardly projecting flange resting on and covering and protecting the top edge of the tailgate so that all exposed surfaces and edges of the cargo compartment are protected during use.

* * * * *